United States Patent
Jung et al.

(10) Patent No.: US 10,831,376 B2
(45) Date of Patent: Nov. 10, 2020

(54) FLASH-BASED ACCELERATOR AND COMPUTING DEVICE INCLUDING THE SAME

(71) Applicants: MemRay Corporation, Seoul (KR); YONSEI UNIVERSITY, UNIVERSITY—INDUSTRY FOUNDATION (UIF), Seoul (KR)

(72) Inventors: Myoungsoo Jung, Incheon (KR); Jie Zhang, Incheon (KR)

(73) Assignees: MemRay Corporation, Seoul (KR); Yonsei University, University-Industry Foundation (UIF), Seoul (KR)

( * ) Notice: Subject to any disclaimer, the term of this patent is extended or adjusted under 35 U.S.C. 154(b) by 71 days.

(21) Appl. No.: 16/032,817

(22) Filed: Jul. 11, 2018

(65) Prior Publication Data
US 2018/0321859 A1    Nov. 8, 2018

Related U.S. Application Data

(63) Continuation of application No. 15/184,179, filed on Jun. 16, 2016.

(30) Foreign Application Priority Data

Apr. 4, 2016   (KR) .................. 10-2016-0041120
Sep. 6, 2017   (KR) .................. 10-2017-0114029
Apr. 20, 2018  (KR) .................. 10-2018-0046379

(51) Int. Cl.
*G06F 12/02*   (2006.01)
*G06F 3/06*    (2006.01)
(Continued)

(52) U.S. Cl.
CPC ............ *G06F 3/0611* (2013.01); *G06F 3/061* (2013.01); *G06F 3/0604* (2013.01); *G06F 3/067* (2013.01);
(Continued)

(58) Field of Classification Search
None
See application file for complete search history.

(56) References Cited

U.S. PATENT DOCUMENTS 5,559,970 A    9/1996  Sharma
6,141,713 A   10/2000  Kang
(Continued)

FOREIGN PATENT DOCUMENTS

KR       10-0806343      2/2008
KR    10-2010-0030602    3/2010
(Continued)

OTHER PUBLICATIONS

NVIDIA GP100 architecture white paper. Whitepaper, 2016.
(Continued)

*Primary Examiner* — Brian R Peugh
(74) *Attorney, Agent, or Firm* — Dinsmore & Shohl LLP

(57) ABSTRACT

A flash-based accelerator configured to be connected to a host including a CPU and a system memory is provided. A plurality of processors execute a plurality of kernels offloaded from the host. A memory system includes a first memory that is used to map a data section of each kernel to the flash memory. A supervisor processor maps a region of the first memory pointed by a data section of a first kernel to a region of the flash memory to allow first data to move between the region of the first memory and the region of the flash memory, based on a first message which is transferred in accordance with execution of the first kernel by a first processor among the plurality of processors. A network
(Continued)

integrates the flash backbone, the memory system, the plurality of processors, and the supervisor processor.

20 Claims, 19 Drawing Sheets

(51) Int. Cl.
    *G06F 13/16*     (2006.01)
    *G06F 12/1009*     (2016.01)

(52) U.S. Cl.
    CPC .......... *G06F 3/0656* (2013.01); *G06F 3/0679* (2013.01); *G06F 12/0246* (2013.01); *G06F 12/1009* (2013.01); *G06F 13/16* (2013.01); *G06F 2212/1024* (2013.01); *G06F 2212/7201* (2013.01); *G06F 2212/7203* (2013.01)

(56) References Cited

U.S. PATENT DOCUMENTS

| | | | |
|---|---|---|---|
| 8,351,460 B2* | 1/2013 | Park | H04N 5/77 370/466 |
| 8,892,827 B2 | 11/2014 | Bernhard, III et al. | |
| 8,898,417 B1* | 11/2014 | Post | G06F 12/00 711/168 |
| 9,116,795 B2 | 8/2015 | Kim et al. | |
| 9,280,466 B2 | 3/2016 | Kunimatsu et al. | |
| 10,013,342 B2 | 7/2018 | Jung | |
| 2004/0049642 A1 | 3/2004 | Liang | |
| 2007/0220309 A1* | 9/2007 | Andre | G06F 11/1435 714/6.12 |
| 2007/0220490 A1* | 9/2007 | Kobayashi | G06F 9/485 717/124 |
| 2008/0098195 A1 | 4/2008 | Cheon et al. | |
| 2010/0082816 A1* | 4/2010 | Kharat | G06F 9/4856 709/226 |
| 2010/0083283 A1* | 4/2010 | Kharat | G06F 9/4856 719/319 |
| 2012/0084532 A1 | 4/2012 | MaCkenna et al. | |
| 2012/0239904 A1* | 9/2012 | Ekanadham | G06F 9/30043 711/207 |
| 2012/0250687 A1* | 10/2012 | Cao | H04L 45/02 370/392 |
| 2014/0229661 A1* | 8/2014 | Tzeng | G06F 12/0866 711/103 |
| 2014/0325098 A1* | 10/2014 | Boyd | G06F 3/0683 710/54 |
| 2015/0293785 A1 | 10/2015 | Murphy | |
| 2015/0363327 A1 | 12/2015 | Chaitanya et al. | |
| 2016/0070701 A1 | 3/2016 | Lim et al. | |
| 2016/0283158 A1 | 9/2016 | Bertolli et al. | |
| 2017/0123690 A1 | 5/2017 | Albot et al. | |

FOREIGN PATENT DOCUMENTS

| | | |
|---|---|---|
| KR | 10-2013-0084846 | 7/2013 |
| KR | 10-2017-0095607 | 8/2017 |

OTHER PUBLICATIONS

A. Acharya, M. Uysal, and J. Saltz. Active Disks: Programming model, algorithms and evaluation. In ACM SIGOPS Operating Systems Review, vol. 32, pp. 81-91. ACM, 1998.
N. Agrawal, V. Prabhakaran, T. Wobber, J. D. Davis, M. S. Manasse, and R. Panigrahy. Design tradeoffs for SSD performance. In USENIX Annual Technical Conference, pp. 57-70, 2008.
J. Ahn, D. Kwon, Y. Kim, M. Ajdari, J. Lee, and J. Kim. DCS: A fast and scalable device-centric server architecture. In Proceedings of the 48th International Symposium on Microarchitecture, pp. 559-571. ACM, 2015.
M. Arora, S. Nath, S. Mazumdar, S. B. Baden, and D. M. Tullsen. Redefining the role of the CPU in the era of CPU-GPU integration. Micro, IEEE, 32(6):4-16, 2012.
J. Axboe, A. D. Brunelle, and N. Scott. Blktrace, 2010.
J. Zhang, G. Park, M. M. Shihab, D. Donofrio, J. Shalf, and M. Jung. OpenNVM: An open-sourced FPGA-based nvm controller for low level memory characterization. In Computer Design (ICCD), 2015 33rd IEEE International Conference on, pp. 666-673. IEEE, 2015.
G. Borriello and R. Want. Embedded computation meets the world wide web. Communications of the ACM, 43(5):59-66, 2000.
R. Budruk, D. Anderson, and T. Shanley. PCI express system architecture. Addison-Wesley Professional, 2004.
W. Bux and I. Iliadis. Performance of greedy garbage collection in flash-based solid-state drives. Performance Evaluation, 67(11):1172-1186, 2010.
L.-P. Chang. On efficient wear leveling for large-scale flash-memory storage systems. In Proceedings of the 2007 ACM symposium on Applied computing, pp. 1126-1130. ACM, 2007.
S. Che, M. Boyer, J. Meng, D. Tarjan, J. W. Sheaffer, S.-H. Lee, and K. Skadron. Rodinia: A benchmark suite for heterogeneous computing. In Workload Characterization, 2009. IISWC 2009. IEEE International Symposium on, pp. 44-54. Ieee, 2009.
S. Cho, C. Park, H. Oh, S. Kim, Y. Yi, and G. R. Ganger. Active disk meets flash: A case for intelligent SSDs. In Proceedings of the 27th international ACM conference on International conference on supercomputing, pp. 91-102. ACM, 2013.
G. Chrysos. Intel xeon phiDc coprocessor—the architecture. Intel Whitepaper, 176, 2014.
T.-S. Chung, D.-J. Park, S. Park, D.-H. Lee, S.-W. Lee, and H.-J. Song. A survey of flash translation layer. Journal of Systems Architecture, 55(5-6):332-343, 2009.
T. I. S. Committee et al. Executable and linkable format (ELF). Specification, Unix System Laboratories, 2001.
S. Damaraju, V. George, S. Jahagirdar, T. Khondker, R. Milstrey, S. Sarkar, S. Siers, I. Stolero, and A. Subbiah. A 22nm IA multi-CPU and GPU system-on-chip. In Solid-State Circuits Conference Digest of Technical Papers (ISSCC), 2012 IEEE International, pp. 56-57. IEEE, 2012.
J. R. Ellis. Bulldog: A compiler for VLIW architectures. Technical report, Yale Univ., New Haven, CT (USA), 1985.
J. A. Fisher. The VLIW machine: a multiprocessor for compiling scientific code. Computer, 17(7):45-53, 1984.
D. Foley. Nvlink, pascal and stacked memory: Feeding the appetite for big data. Nvidia.com, 2014.
N. K. Govindaraju, B. Lloyd, Y. Dotsenko, B. Smith, and J. Manferdelli. High performance discrete fourier transforms on graphics processors. In Proceedings of the 2008 ACM/IEEE conference on Supercomputing, p. 2. IEEE Press, 2008.
B. Gu, A. S. Yoon, D.-H. Bae, I. Jo, J. Lee, J. Yoon, J.-U. Kang, M. Kwon, C. Yoon, S. Cho, et al. Biscuit: A framework for near-data processing of big data workloads. In Computer Architecture (ISCA), 2016 ACM/IEEE 43rd Annual International Symposium on, pp. 153-165. IEEE, 2016.
A. Gupta, Y. Kim, and B. Urgaonkar. DFTL: a flash translation layer employing demand-based selective caching of page-level address mappings, vol. 44. ACM, 2009.
B. He, W. Fang, Q. Luo, N. K. Govindaraju, and T. Wang. Mars: a mapreduce framework on graphics processors. In Proceedings of the 17th international conference on Parallel architectures and compilation techniques, pp. 260-269. ACM, 2008.
G. Hegde, N. Ramasamy, N. Kapre, et al. Caffepresso: an optimized library for deep learning on embedded accelerator-based platforms. In Proceedings of the International Conference on Compilers, Architectures and Synthesis for Embedded Systems, p. 14. ACM, 2016.
J. Huang, A. Badam, M. K. Qureshi, and K. Schwan. Unified address translation for memory-mapped ssds with flashmap. In Computer Architecture (ISCA), 2015 ACM/IEEE 42nd Annual International Symposium on, pp. 580-591. IEEE, 2015.
A. M. Inc. 512k × 16 bit super low power cmos sram datasheet. URL: http://www.alliancememory.com/pdf/AS6C8016.pdf, 2007.
T. Instruments. Throughput performance guide for keystone II devices.

(56) References Cited

OTHER PUBLICATIONS

T. Instruments. Multicore fixed and floating-point digital signal processor (tms320c6678). URL: http://www.ti.com/lit/ds/symlink/tms320c6678.pdf, 2014.
Intel. Advanced host controller interface specification. URL: http://www.intel.com/content/www/us/en/io/serial-ata/ahci.html, 2010.
Intel. Intel xeon processor E5 2620 v3. URL: http://ark.intel.com/products/83352/Intel-Xeon-Processor-E5-2620-v3-15M-Cache-2-40-GHz, 2015.
Intel. Intel ssd 750 series. URL:http://www.intel.com/content/www/us/en/solidstate-drives/solid-state-drives-750-series.html, 2015.
S.-W.Jun, M. Liu, S. Lee, J. Hicks, J. Ankcorn, M. King, S. Xu, et al. BlueDBM: an appliance for big data analytics. In Computer Architecture (ISCA), 2015 ACM/IEEE 42nd Annual International Symposium on, pp. 1-13. IEEE, 2015.
M. Jung. Exploring design challenges in getting solid state drives closer to CPU. IEEE Transactions on Computers, 65(4):1103-1115, 2016.
M. Jung. Nearzero: An integration of phase change memory with multi-core coprocessor. IEEE Computer Architecture Letters, 16(2):136-140, 2017.
M. Jung and M. Kandemir. Middleware—firmware cooperation for high-speed solid state drives. In Proceedings of the Posters and Demo Track, p. 5. ACM, 2012.
M. Jung and M. Kandemir. Challenges in getting flash drives closer to CPU. Future, 2(4.00):8-00, 2013.
M. Jung, R. Prabhakar, and M. T. Kandemir. Taking garbage collection overheads off the critical path in ssds. In ACM/IFIP/USENIX International Conference on Distributed Systems Platforms and Open Distributed Processing, pp. 164-186. Springer, 2012.
M. Jung, W. Choi, J. Shalf, and M. T. Kandemir. Triple-A: a non-SSD based autonomic all-flash array for high performance storage systems. In ACM SIGARCH Computer Architecture News, vol. 42, pp. 441-454. ACM, 2014.
M. Jung,W. Choi, S. Srikantaiah, J. Yoo, and M. T. Kandemir. HIOS: a host interface I/O scheduler for solid state disks. In ACM SIGARCH Computer Architecture News, vol. 42, pp. 289-300. IEEE Press, 2014.
K. Keeton, D. A. Patterson, and J. M. Hellerstein. A case for intelligent disks (IDISKs). ACM SIGMOD Record, 27(3):42-52, 1998.
J. Kim, J. M. Kim, S. H. Noh, S. L. Min, and Y. Cho. A space-efficient flash translation layer for compactflash systems. IEEE Transactions on Consumer Electronics, 48(2):366-375, 2002.
S.-W. Kim, J. J.-S. Lee, V. Dugar, and J. De Vega. Intel power gadget. Intel Corporation, 7, 2014.
M. Lam. Software Pipelining: An effective scheduling technique for VLIW machines. In ACM Sigplan Notices, vol. 23, pp. 318-328. ACM, 1988.
C. Lee, J. K. Lee, T. Hwang, and S.-C. Tsai. Compiler optimization on instruction scheduling for low power. In Proceedings of the 13th international symposium on System synthesis, pp. 55-60. IEEE Computer Society, 2000.
S. Lee, M. Liu, S.W. Jun, S. Xu, J. Kim, and A. Arvind. Application-managed flash. In FAST, pp. 339-353, 2016.
S. Manayski et al. CUDA compatible GPU as an efficient hardware accelerator for AES cryptography. In Signal Processing and Communications, 2007. ICSPC 2007. IEEE International Conference on, pp. 65-68. IEEE, 2007.
Micron. Mt29f64g08. URL: http://goo.gl/GXV5Qq, 2014.
G. Mitra, E. E Stotzer, A. Jayaraj, and A. P. Rendell. Implementation and optimization of the openmp accelerator model for the ti keystone II architecture. In International Workshop on OpenMP, pp. 202-214. Springer, 2014.
NVIDIA. Pascal GPU Architecture http://www.nvidia.com/object/pascalarchitecture-whitepaper.html. 2016.
J. T. Nvidia. Nvidia jetson TX1 system-on-module, 2015.
N. Otterness, M. Yang, S. Rust, E. Park, J. H. Anderson, F. D. Smith, A. Berg, and S.Wang. An evaluation of the NVDIA TX1 for supporting real-time computer-vision workloads. In Real-Time and Embedded Technology and Applications Symposium (RTAS), 2017 IEEE, pp. 353-364. IEEE, 2017.
J. Ouyang, S. Lin, S. Jiang, Z. Hou, Y. Wang, and Y. Wang. SDF: Software-defined flash for web-scale internet storage systems. In ACM SIGPLAN Notices, vol. 49, pp. 471-484. ACM, 2014.
Parallella. Epiphany-iii 16-core microprocessor. http://www.adapteva.com/epiphanyiii/.
D. Parameter Symbol. DDR3L-1333 ddr3/ddr31-1600 units notes min. Max. Min. Max, 2012.
C. Park, W. Cheon, J. Kang, K. Roh, W. Cho, and J.-S. Kim. A reconfigurable FTL (flash translation layer) architecture for NAMD flash-based applications. ACM Transactions on Embedded Computing Systems (TECS), 7(4):38, 2008.
L.-N. Pouchet. Polybench: The polyhedral benchmark suite. URL: http://www.cs.ucla.edu/~pouchet/software/polybench/[cited July,], 2012.
H. Semiconductor et al. Open NAND flash interface specification. Technical report, Technical Report Revision 1.0, ONFI, www.onfi.org, Dec. 28, 2006.
S. Seshadri, M. Gahagan, S. Bhaskaran, T. Bunker, A. De, Y. Jin, Y. Liu, and S. Swanson. Willow: A user-programmable SSD. In Proceedings of the 11th USENIX conference on Operating Systems Design and Implementation, pp. 67-80. USENIX Association, 2014.
N. Shahidi, M. Arjomand, M. Jung, M. T. Kandemir, C. R. Das, and A. Sivasubramaniam. Exploring the potentials of parallel garbage collection in SSDs for enterprise storage systems. In Proceedings of the International Conference for High Performance Computing, Networking, Storage and Analysis, p. 48. IEEE Press, 2016.
G. Shainer, A. Ayoub, P. Lui, T. Liu, M. Kagan, C. R. Trott, G. Scantlen, and P. S. Crozier. The development of mellanox/NVIDIA GPUDirect over infiniBand—a new model for GPU to GPU communications. Computer Science—Research and Development, 26(3-4):267-273, 2011.
J. Zhang, D. Donofrio, J. Shalt M. T. Kandemir, and M. Jung. NVMMU: A nonvolatile memory management unit for heterogeneous GPU-SSD architectures. In 2015 International Conference on Parallel Architecture and Compilation (PACT), pp. 13-24. IEEE, 2015.
M. Silberstein, B. Ford, I. Keidar, and E. Witchel. GPUfs: integrating a file system with GPUs. In ACM SIGPLAN Notices, vol. 48, pp. 485-498. ACM, 2013.
J. Standard. DDR4 SDRAM. JEDEC Solid State Technology Association, JESD79-4, 151, 2012.
R. E. Tarjan. Abstract of Updating a balanced search tree in O(1) rotations. Information Processing Letters, 16 (5):253-257, 1983.
TI. Multicore software development kit. URL: https://training.ti.com/multicoresoftware-development-kit-mcsdk-keystone-devices, 2011.
TI. Ti code generation tools. URL: http://processors.wiki.ti.com/index.php/Category:Compiler, 2014.
TI. Common object file format. URL: http://www.ti.com/lit/an/spraao8/spraao8.pdf, 2014.
TI. Multicore application deployment (MAD) utilities. URL: http://processors.wiki.ti.com/index.php/MAD-Utils-User-Guide, 2014.
TI. Ti keystone architecture. URL: http://www.ti.com/lit/ml/sprt548/sprt548.pdf, 2014.
TI. Keystone architecture multicore navigator. URL: http://www.ti.com/lit/ug/sprugr9h/sprugr9h.pdf, 2015.
D. Tiwari, S. S Boboila, S. S. Vazhkudai, Y. Kim, X. Ma, P. Desnoyers, and Y. Solihin. Active flash: towards energy-efficient, in-situ data analytics on extreme-scale machines. In FAST, pp. 119-132, 2013.
H.-W. Tseng, Q. Zhao, Y. Zhou, M. Gahagan, and S. Swanson. Morpheus: creating application objects efficiently for heterogeneous computing. ISCA, 2016.
Q. Wei, C. Chen, and J. Yang. CBM: A cooperative buffer management for SSD. In Mass Storage Systems and Technologies (MSST), 2014 30th Symposium on, pp. 1-12. IEEE, 2014.
W. Wolf, A. A. Jerraya, and G. Martin. Multiprocessor system-on-chip (MPSoC) technology. IEEE Transactions on Computer-Aided Design of Integrated Circuits and Systems, 27(10):1701-1713, 2008.
S. A. Workgroup. Sata: High speed serialized AT attachment. X Y D D, 2001.

(56) References Cited

OTHER PUBLICATIONS

Xilinx. Vc707 evaluation board for the virtex-7 fpga. https://www.xilinx.com/support/documentation/boards_and_kits/vc707/ug885_VC707_Eval_Bd.pdf.
Xilinx. Virtex ultrascale. URL: https://www.xilinx.com/products/silicondevices/fpga/virtex-ultrascale.html, 2015.
J. Zhang, M. Shihab, and M. Jung. Power, energy and thermal considerations in SSD-based I/O acceleration. In Proceedings of the 6th USENIX conference on Hot Topics in Storage and File Systems, pp. 15-15. USENIX Association, 2014.
Larry Seiler et al., "Larrabee: A Many-Core x86 Architecture for Visual Computing", ACM Transactions on Graphics, vol. 27, No. 3, Article 18, Aug. 2008.
Myoungsoo Jung et al., "NANDFlashSim: Intrinsic Latency Variation Aware NAND Flash Memory System Modeling and Simulation at Microarchitecture Level", IEEE, Published in 012 IEEE 28th Symposium on Mass Storage Systems and Technologies (MSST), Apr. 2012.
Rajeev Balasubramonian et al., "Near-Data Processing: Insights From a Micro-46 Workshop", IEEE Computer Society, vol. 34 , Issue: 4, Jul.-Aug. 2014.
"PolyBench/C; the Polyhedral Benchmark suite", PolyBench/C—Homepage of Louis-Noël Pouchet, May 14, 2015: Public release of PolyBench/C 4.1 http://web.cse.ohio-state.edu/-pouchet/software/polybench/.
Jaeyoung Do et al., "Query Processing on Smart SSDs: Opportunities and Challenges", ACM, pp. 1221-1230, Jun. 22, 2013.
Ali Ali et al., "RASSD: A Dynamically Reconfigurable Active Storage Device for Energy Efficient Data Analytics", IEEE, Published in: 2013 4th Annual International Conference on Energy Aware Computing Systems and Applications (ICEAC), pp. 81-86, Dec. 2013.
Myoungsoo Jung et al., "Sprinkler: Maximizing Resource Utilization in Many-Chip Solid State Disks", IEEE(2014 IEEE 20th International Symposium on High Performance Computer Architecture (HPCA)), Feb. 2014.
White Paper, "Flash Fabric Architecture", Violin Memory, Inc., Mar. 2016, www.violin-memory.com.
Benjamin Y. Cho et al., "XSD: Accelerating MapReduce by Harnessing the GPU inside an SSD", 46th IEEE/ACM International Symposium on Microarchitecture (MICRO-46), Dec. 8, 2013.
NAND Flash Memory Data Sheet(2Gb: x8, x16 NAND Flash Memory Features), Micron Technology, Inc., Revised History Sep. 2010 www.micron.com/productsupport.
Noor Abbani et al., "A Distributed Reconfigurable Active SSD Platform for Data Intensive Applications", IEEE(High Performance Computing and Communications (HPCC), 2011 IEEE 13th International Conference) , Sep. 2011, pp. 25-34.
Christian Bernard and Fabien Clermidy, "A Low-Power VLIW processor for 3GPP-LTE Complex Numbers Processing", IEEE, Mar. 2011, pp. 1-6.
Erik Riedel et al., "Active Storage for Large-Scale Data Mining and Multimedia Applications", School of Computer Science Carnegie Mellon University, Feb. 1998.
Danyu Zhu et al., "Building High Performance Storage for Hyper-V Cluster on Scale-Out File Servers using Violin Windows Flash Arrays", Microsoft White Paper, Oct. 2014.
DDR3 SDRAM, Wikipedia, https://en.wikipedia.org/wiki/DDR3_SDRAM.
Yangwook Kang et al., "Enabling Cost-effective Data Processing with Smart SSD", IEEE, May 2013, pp. 1-12.
I. Stephen Choi et al., "Energy Efficient Scale-In Clusters with In-Storage Processing for Big-Data Analytics", ACM, Oct. 5, 2015, pp. 265-273.
Product Specificaiton, GeForce GT 610, NVIDIA Corporation, http://www.geforce.com/hardware/desktop-gpus/geforce-gt-610/specifications.
Abdulrahman Kaitoua et al., "Hadoop Extensions for Distributed Computing on Reconfigurable Active SSD Clusters", ACM, vol. 11 Issue 2, Article No. 2, Jun. 2014.
Product Specifications, Intel® SSD 750 Series: Performance Unleashed, Intel, http://www.intel.com/content/www/us/en/solid-state-drives/solid-state-drives-750-series.html.

\* cited by examiner

FIG. 15

```
FOR    j=0..3
   ex[0][j]=_fict_[0]
ENDFOR                              Microblock 0
FOR    i=0..3
  FOR    j=0..3
      ey[i][j]=ey[i][j]-hz[i+1][j]-hz[i][j]
  ENDFOR
  FOR    j=1..3
      ex[i][j]=ex[i+1][j]-hz[i][j]-hz[i][j-1]
  ENDFOR
ENDFOR                              Microblock 1
FOR    i=0..3
  FOR    j=0..3
screen     hz[i][j]=hz[i][j]-ex[i][j+1]-ex[i][j]
                  +ey[i+1][j]-ey[i][j]
  ENDFOR
ENDFOR                              Microblock 2
```

FLASH-BASED ACCELERATOR AND COMPUTING DEVICE INCLUDING THE SAME

CROSS-REFERENCE TO RELATED APPLICATION

This application is a continuation-in-part of U.S. patent application Ser. No. 15/184,179 filed on Jun. 16, 2016, and claims priority to and the benefit of Korean Patent Applications Nos. 10-2016-0041120 filed on Apr. 4, 2016, 10-2017-0114029 filed on Sep. 6, 2017, and 10-2018-0046379 filed on Apr. 20, 2018. The entire contents of the aforementioned applications are incorporated herein by reference.

BACKGROUND

(a) Field

The described technology relates to a flash-based accelerator and a computing device including the same.

(b) Description of the Related Art

Over the past few years, heterogeneous computing has undergone significant performance improvements for a broad range of data processing applications. This has been made possible by incorporating many dissimilar coprocessors, such as graphics processing units (GPUs) and many integrated cores (MICs). These many-core based accelerators can process programs offloaded from a host by employing hundreds and thousands of hardware threads, which in turn can exhibit orders of magnitude better performance than central processing units (CPUs).

The accelerators can process more data than they have ever had before, and the volume of such data is expected to be increased. However, the accelerators employ an internal memory whose size is relatively smaller compared to a host memory. The accelerators therefore use a non-volatile memory, for example a solid state disk (SSD), connected to a host machine to process large sets of data.

However, the accelerator and the non-volatile memory are completely disconnected from each other and are managed by different software stacks. Consequently, many redundant memory allocations/releases and data copies exist between a user-space and a kernel-space in order to read data from the non-volatile memory or write data to the non-volatile memory. Further, since a kernel module cannot directly access the user-space memory, memory management and data copy overheads between the kernel-space and the user-space are unavoidable. Furthermore, kernel-mode and user-mode switching overheads along with the data copies also contribute to long latency of data movements. These overheads causes the speedup improvement to be not significant compared to the accelerator performance.

SUMMARY

An embodiment of the present invention provides a flash-based accelerator and a computing device including the same, capable of executing diverse kernels.

According to an embodiment of the present invention, a flash-based accelerator configured to be connected to a host including a CPU and a system memory is provided. The flash-based accelerator includes a flash backbone including a flash memory and a flash controller, a plurality of processors that execute a plurality of kernels offloaded from the host, a memory system, a supervisor processor, and a network. The memory system includes a first memory that is used to map a data section of each kernel to the flash memory. The supervisor processor maps a region of the first memory pointed by a data section of a first kernel to a region of the flash memory to allow first data to move between the region of the first memory and the region of the flash memory, based on a first message which is transferred in accordance with execution of the first kernel by a first processor among the plurality of processors. The network integrates the flash backbone, the memory system, the plurality of processors, and the supervisor processor.

The first data may move between the first memory and the flash memory without assistance of an operating system (OS) of the host.

The first data may move between the first memory and the flash memory without modification of an instruction set architecture used in an existing computing device.

The supervisor processor may transfer a memory request indicating the region of the flash memory to the flash controller, and the flash controller may move the first data between the region of the first memory and the region of the flash memory in accordance with the memory request.

The first processor may access the flash backbone through the memory request without modification of existing load/store instructions.

When the first kernel reads the first data from the flash memory, the first message may include a pointer to the data section of the first kernel and a word- or byte-based address, and the supervisor processor may translate the word- or byte-based address to a physical address in the flash memory. The memory system may further include a second memory that stores mapping information for translating the word- or byte-based address to the physical address.

The mapping information may include mapping information between a logical page group number corresponding to the word- or byte-based address and a physical page group number corresponding to the physical address.

The supervisor processor may block processing of the first message when a range of the word- or byte-based address overlaps with a range of an address that another kernel uses for write.

A second processor among the plurality of processors may transfer to the supervisor processor a second message for writing second data to the flash memory in accordance with execution of a second kernel, and the second message may include a pointer to a data section of the second kernel. The supervisor processor may allocate a new region of the flash memory for the second message to allow the second data to move from a region of the first memory pointed by the data section of the second kernel to the new region of the flash memory.

The supervisor processor may transfer a memory request indicating the new region of the flash memory, and the flash controller may transfer the second data from the region of the first memory pointed by the pointer to the data section of the second kernel to the new region of the flash memory, in accordance with the memory request.

The supervisor processor may update the mapping information based on a physical address corresponding to the new region of the flash memory and a word or byte-based address included in the second message.

The supervisor processor may block processing of the second message when a range of the word- or byte-based address included in the second message overlaps with a range of an address that another kernel uses for read.

The supervisor processor may allocate a physical page group number corresponding to the new region by increasing a physical page group number used in a previous write.

The flash-based accelerator may further include a store processor. In this case, the supervisor processor may transfer a request for reclaiming a physical block to the store processor to allocate a physical page group number corresponding to the new region when there is no available physical page group number in the flash memory. The store processor may reclaim the physical block by selecting a victim block in a space of the flash memory.

The store processor may journal a snapshot of the second memory.

According to another embodiment of the present invention, a computing device including the above-described flash-based accelerator, the host, and an interface that connects the flash-based accelerator and the host is provided.

According to yet another embodiment of the present invention, a flash-based accelerator configured to be connected to a host including a CPU and a system memory is provided. The flash-based accelerator includes a flash backbone including a flash memory and a flash controller, a plurality of processors that execute a plurality of kernels offloaded from the host, a memory system, a supervisor processor, and a network. The memory system includes a first memory that is used to map a data section of each kernel to the flash memory, and a second memory that stores mapping information for translating a word- or byte-based address mapped to a region of the first memory pointed by the data section to a physical address in the flash memory. When read data are read from the flash memory in accordance with execution of each kernel, the supervisor processor may translate the word- or byte-based address to the physical address of the flash memory based on the mapping information, and transfer a memory request to the flash controller to allow the read data to move from the flash memory to the region of the first memory. The network integrates the flash backbone, the memory system, the plurality of processors, and the supervisor processor.

The read data may move between the flash memory and the first memory without assistance of an OS of the host.

The read data may move between the flash memory and the first memory without modification of an instruction set architecture used in an existing computing device.

Each of the plurality of processors may access the flash backbone through the memory request without modification of existing load/store instructions.

According to an embodiment of the present invention, overheads resulting from data copies/movements can be reduced by physically integrating a plurality of processors with a flash memory to implement a flash-based accelerator. Further, the flash-based accelerator can execute diverse kernels without an assistance of an OS of a host and the processor can directly access the flash memory at execution of the kernel, by integrating a plurality of processors with a flash memory

BRIEF DESCRIPTION OF THE DRAWINGS

FIG. 15 shows an example of a kernel.

DETAILED DESCRIPTION OF THE EMBODIMENTS

Figure 1:
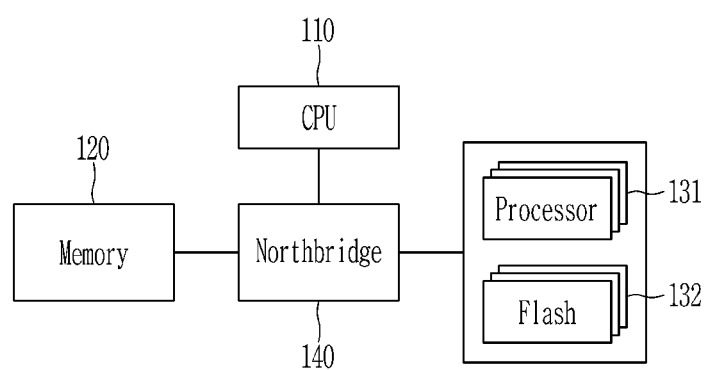
FIG. 1 is a schematic block diagram of a computing device according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 is a schematic block diagram of a computing device according to an embodiment of the present invention. FIG. 1 shows one example of the computing device, and the computing device according to an embodiment of the present invention may be implemented by use of various structures.

Referring to FIG. 1, a computing device according to an embodiment of the present invention includes a CPU 100, a CPU-side memory 200, and a flash-based accelerator 300. The accelerator 300 is a supplementary data processing device different from a general-purpose CPU, and may be computer hardware for performing data processing by supplementing functions of the CPU or performing the data processing independently of the CPU. The accelerator 300 may be a many-core based accelerator, and a graphic processing unit (GPU) or many integrated core (MIC) device is one example of the accelerator 300.

The computing device may further include a northbridge 400 for connecting the memory 200 and the accelerator 300 with the CPU 100. The accelerator 300 may be connected to the northbridge 140 that locates at the CPU-side. For example, the accelerator 300 may be connected to the northbridge 140 via a PCIe (peripheral component interconnect express) link. The northbridge 140 may be also called a memory controller hub (MCH).

While a conventional accelerator includes only a plurality of processors for parallelism, the accelerator 300 according to an embodiment of the present invention is a flash-based accelerator, which physically integrates a plurality of processors 310 corresponding to accelerator cores with a flash memory 320.

In some embodiment, each processor of the accelerator 300 may be a light-weight processor (LWP). In one embodiment, the LWPs may be low power processors that are connected over a high-speed network. In this case, the LWP can communicate with other internal resources such as an accelerator controller and the flash memory through the high-speed network. Hereinafter, each processor of the accelerator 300 is described as the LWP for convenience.

In some embodiment, a system including the CPU 100 and the memory 200 may be called a host.

The computing device offloads various applications to the accelerator 300, which allows the accelerator 300 to directly execute kernels of the applications. Accordingly, the host may access the accelerator 300 to either offload the kernel or handle read/write of data. In this case, the LWP of the accelerator 300 can directly access the flash memory with executing the kernel. Therefore, many redundant memory allocations/releases and data copies that are required to read data from the non-volatile memory or write data to the non-volatile memory by the conventional accelerator can be removed.

First, problems of an existing computing device are described with reference to FIG. 2 to FIG. 4.

Figure 2:
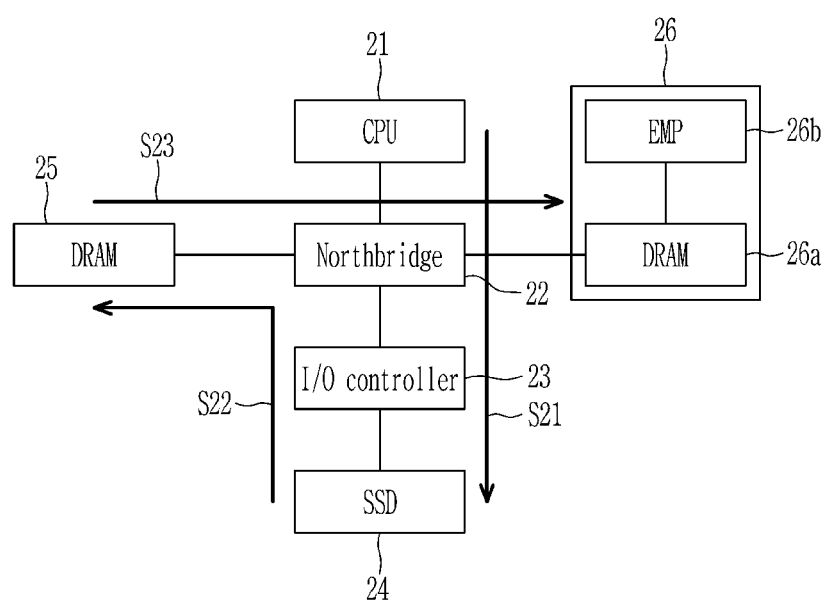
FIG. 2 shows a physical data path in an existing computing device.
Figure 3:
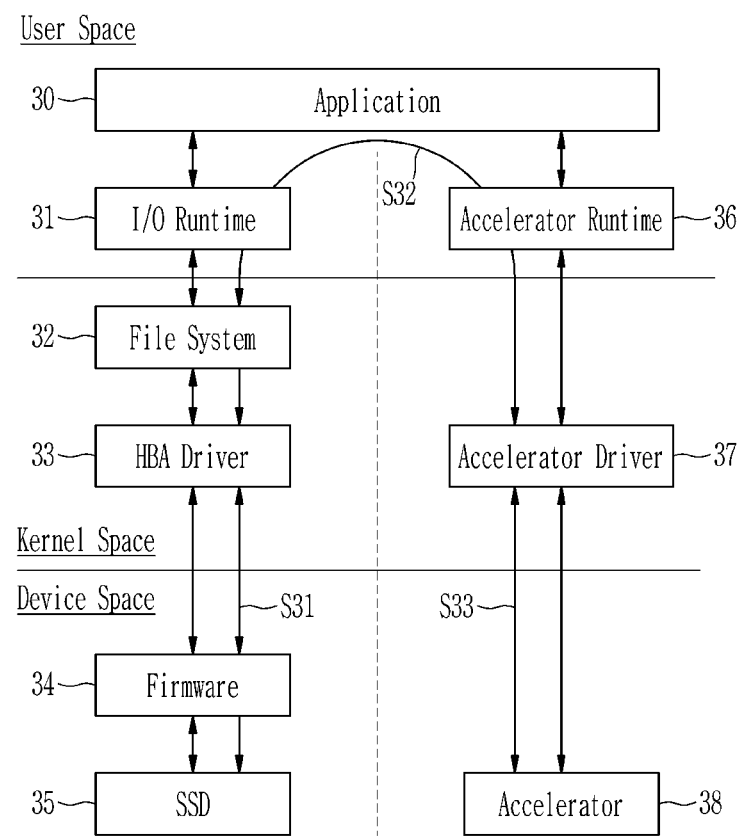
FIG. 3 shows a software stack in an existing computing device.
Figure 4:
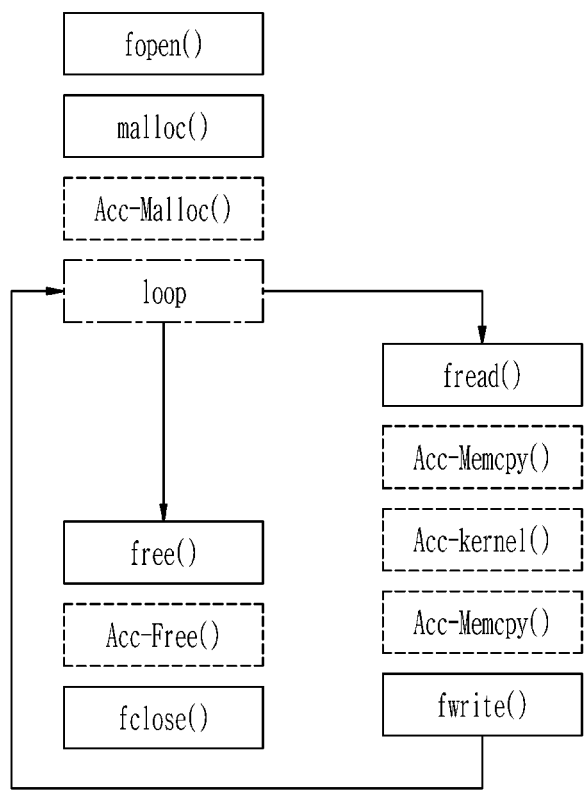
FIG. 4 shows a kernel executing model in an accelerator of an existing computing device.

FIG. 2 shows a physical data path in an existing computing device, FIG. 3 shows a software stack in an existing computing device, and FIG. 4 shows a kernel executing model in an accelerator of an existing computing device.

Referring to FIG. 2, in a case where an accelerator 26 needs to process a large amount of data, a CPU 21 generates I/O requests and issues them to an SSD 24 through an I/O controller 23 connected to a northbridge 22 (S21). A controller of the SSD 24 then transfers the data from a flash memory to an internal DRAM, and a host controller moves the data from the internal DRAM of the SSD 24 to a host-side DRAM 25 through a storage interface (S22). During this time, the data can be reconstructed and marshaled as a form of objects that the accelerator 26 can recognize. Finally, the CPU 21 transfers the data from the host-side DRAM 25 to an internal DRAM 26a of the accelerator 26 through a PCIe interface (S23). At this juncture, all kernel executions of the accelerator 26 are still stalled because the input data are in being transferring and are not ready to be processed. Once the data are successfully downloaded to the DRAM 26a of the accelerator 26, an embedded multicore processor (EMP) 26b of the accelerator 26 starts processing the data, and the results are delivered to the SSD 24 in an inverse order of the input data loading procedure.

In this case, the movement of data across different physical interface boundaries imposes the restriction of long latency before the accelerator 26 begins to actually process data and leads to a waste of energy, resulting from the creation of redundant memory copies. In addition, the physical data path can deteriorate the degree of parallelism for kernel executions. For example, a single application task has to be split into multiple kernels due to capacity limit of the internal DRAM 26a of the accelerator 26, in turn serializing the execution and thereby deteriorating the degree of parallelism.

Software stacks for the existing computing exist for an accelerator 35 and an SSD 38, respectively. Referring to FIG. 3, a host employs an accelerator driver (i.e., a device driver) 37 and a runtime library 36 as the software stack for the accelerator 35, and employs a flash firmware 34, a host block adaptor (HBA) driver 33, a file system 32, and an I/O runtime library 31 as the software stack to recognize the SSD 35 as a storage. The accelerator runtime library 36 and the I/O runtime library 31 are provided on a user space, and offer different sets of interfaces, which allow a user application 30 to service files or offload data processing, appropriately. The accelerator driver 37 and the HBA driver 33, which are provided on a kernel space, are involved in transferring data between a device-side DRAM (an accelerator- or SSD-side DRAM) and a host-side DRAM. Therefore, the user application 30 first requests data to the SSD 35 through the I/O runtime library 31 (S31), and then writes the data to the accelerator 38 through the accelerator runtime library 36 (S33). This activity causes multiple data to be copied within the host-side DRAM (S32). Furthermore, when the file system 32 and accelerator driver 37 provided on the kernel space receive data from the application 30, all the data from user buffers are copied to OS-kernel buffers, which creates extra memory copies within the host-side DRAM (S32). This problem arises because OS-kernel modules cannot directly access a user memory space, as there is no guarantee that a current OS-kernel module is executing in a process that the I/O request has been initiated. In addition to these unnecessary data copies within the host-side DRAM, the discrete software stacks also increase data moving latency and consume energy because they enforce many user/kernel mode switches between the runtime libraries and the OS-kernel drivers.

Referring to FIG. 4, a kernel execution model may be implemented as three states including a prologue, a body, and an epilogue. In the prologue, a data processing application opens a file [fopen( )] and allocate memory resources for both an SSD and an accelerator [malloc( ) Acc-Malloc( )]. In the body, the data processing application iterates code segments that read a part of file [fread( )], transfer it to the accelerator [Acc-Memcpy( )], execute a kernel [Acc-kernel( )], get results from the accelerator [Acc-Memcpy( )], and write them back to the SSD [fwrite( )]. In the epilogue, once the execution of body loop is completed, the data processing application concludes [fclose( )] by releasing all the file and memory resources [free( ), Acc-Free( )]. In this case, the codes such as fopen( ), malloc( ), fread( ), fwrite( ), free( ), and fclose( ) may be executed by an I/O runtime, and the codes such as Acc-Malloc( ), Acc-Memcpy( ), Acc-kernel( ), and Acc-Free( ) may be executed by an accelerator runtime.

In this kernel execution model, file accesses of the application pass different software runtime libraries and stacks, which in turn can significantly increase overheads before the computation is started and deteriorate the system performance. Further, a small memory size of the accelerator can enforce a single data-processing task split into multiple functions, which can only be executed by the accelerator in a serial order. Consequently, the degree of parallelism can be deteriorated.

Next, an accelerator according to an embodiment of the present invention is described with reference to FIG. 5 and FIG. 6.

Figure 5:
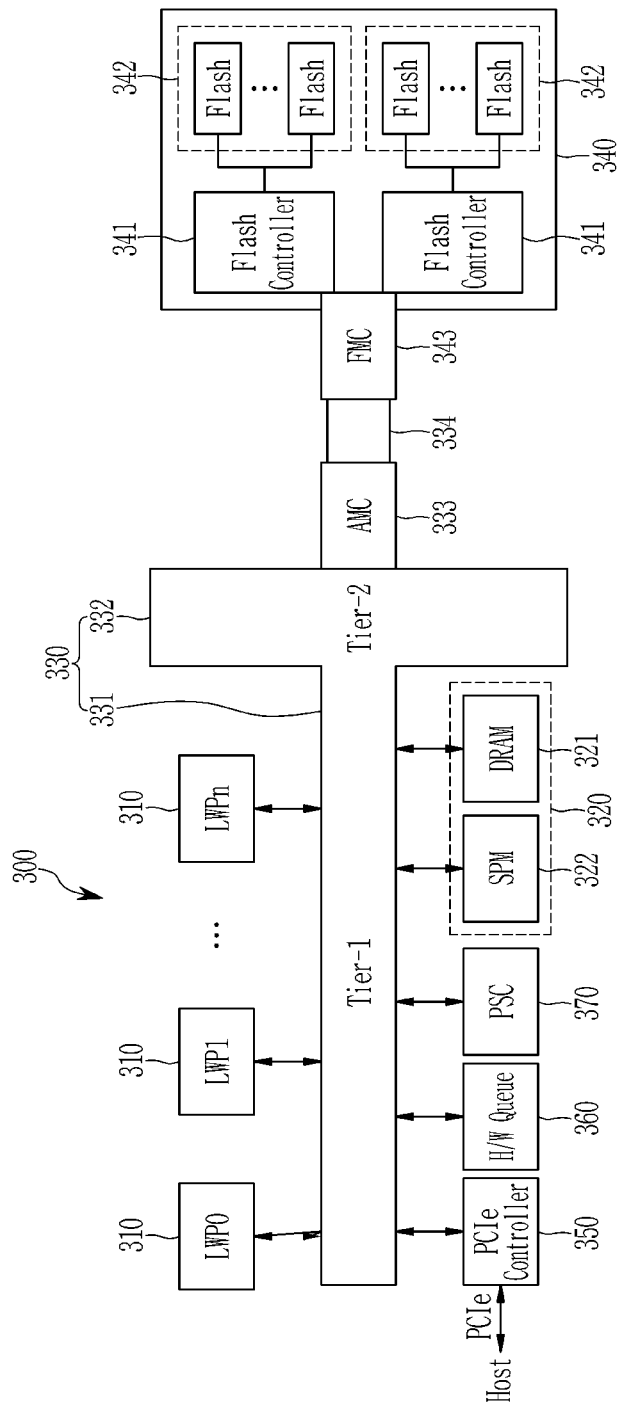
FIG. 5 is a schematic block diagram of a flash-based accelerator according to an embodiment of the present invention.
Figure 6:
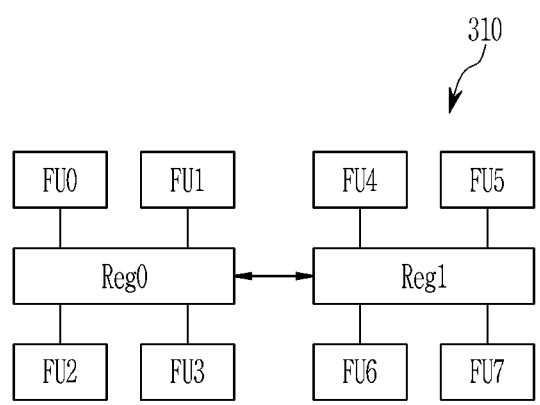
FIG. 6 is a schematic block diagram of an LWP in a flash-based accelerator according to an embodiment of the present invention.

FIG. 5 is a schematic block diagram of a flash-based accelerator according to an embodiment of the present invention, and FIG. 6 is a schematic block diagram of an LWP in a flash-based accelerator according to an embodiment of the present invention.

Referring to FIG. 5, a flash-based accelerator 300 includes a plurality of LWPs (LWP0 to LWPn) 310, a memory system 320, a network 330, a flash backbone 340, and an accelerator controller 350.

Each LWP 310 corresponds to a core of the accelerator 300 for performing data processing. The LWPs 310 are all connected over a network 330, for example, a crossbar network. The LWP 310 can communicate with each other over message queue interfaces that are implemented by collaborating with a hardware queue 360 attached to the network 330. In some embodiments, the LWP 310 may be built on a very long instruction word (VLIW) architecture.

Referring to FIG. 6, each LWP 310 may include a plurality of function units, for example, eight function units. The function units may include multiplication function units FU0 and FU4, load/store function units FU1 and FU5, and general purpose processing function units FU2, FU3, FU6, and FU7. It is shown as an example in FIG. 6 that the function units includes two multiplication function units FU0 and FU4, two load/store function units FU1 and FU5, and four general purpose processing function units FU2, FU3, FU6, and FU7. Each LWP 310 may further include a plurality of register files, for example, two register files Reg0 and Reg1. In this case, the multiplication function unit FU0, the load/store function unit FU1, and the general purpose processing functions unit FU2 and FU3 may be connected to the register file Reg0, and the multiplication function unit FU4, the load/store function unit FU5, and the general purpose processing function units FU6 and FU7 may be connected to the register file Reg1. Further, the two register files Reg0 and Reg1 may be connected to each other. Accordingly, the hardware complexity of the accelerator can be reduced, while the diverse demands of low-power data processing applications can be satisfied simultaneously.

Furthermore, the LWPs 310 may share a single memory address space, and each LWP 310 may further include caches. In some embodiments, the caches of each LWP 310 may include a level 1 (L1) cache and a level 2 (L2) cache, and the L1 cache may include an L1 instruction (L1I) cache and an L1 data (L1D) cache.

The memory system 320 includes different memory systems connected to the LWP 310, for example, a first memory 321 and a second memory 322. In some embodiments, the memory system 320 may operate as a buffer memory between a flash memory for reading and writing data in pages and the LWPs 310 for reading and writing data in words or bytes. The page may be, for example, 4 KB to 16 KB. In one embodiment, the first memory 321 may be a word- or byte-addressable memory.

In some embodiments, the first memory 321 may be a low-power memory such as a dynamic random access memory (DRAM). For example, the DRAM may be a DDR3L (DDR3 low voltage) SDRAM (synchronous DRAM). The first memory 321 may be used for mapping data sections of each kernel to the flash memory thereby hiding a long latency imposed by flash accesses. Further, the first memory 321 may aggregate multiple I/O requests that head to the flash backbone 340, and may buffer the majority of flash writes, which can take over roles of a traditional SSD internal cache. The second memory 322 may be a memory used for a fast processing. For example, a scratch-pad memory (SPM) may be used as the second memory 332. The SPM may be composed of, for example, a plurality of high-speed SRAM (static random access memory) banks.

The second memory 322 may serve administrative I/O requests by virtualizing the flash and entries queued by communication interfaces as fast as an L2 cache.

The network 330 connects the LWPs 310, the memory system 320, and the flash backbone 340. In some embodiments, the network 330 may be a partial crossbar switch that separates a large network into two sets of crossbar configurations 331 and 332. The two sets of crossbar configurations 331 and 332 may be a streaming crossbar (tier-1) 331 and multiple simplified-crossbars (tier-2) 332. In one embodiment, the tier-1 network 331 is connected to the LWPs 310 and the memory system 320, and may be designed towards high performance thereby integrating the LWPs 310 with the memory system 320. The tier-2 network 332 is connected to the flash backbone 340, and may be connected to a mezzanine card, for example an FMC (FPGA mezzanine card), of the flash backbone 340 through a mezzanine card 333, for example an AMC (advanced mezzanine card). In this case, the AMC 333 of the tier-2 network 332 and the FMC 343 of the flash backbone 340 may be connected to each other through a plurality of SRIO (Serial RapidIO) lanes 334, for example four SRIO lanes. Throughputs of the tier-2 network 332 may be sufficient for performances of AMC 333 and an interface (e.g., a PCIe interface) exhibit.

The flash backbone 340 includes a flash memory 341 and a flash controller 342. The flash memory 341 may include a plurality of flash packages. In one embodiment, the flash memory 341 may include a plurality of flash channels, each including a plurality of flash packages. The flash controller 342 converts incoming I/O requests into a flash clock domain, and may be an FPGA (field-programmable gate array)-based controller. In one embodiment, the flash controller 342 may be provided for each flash channel. In one embodiment, the flash controller 342 may implement inbound and outbound tag queues, each of which is used for buffering the requests. The flash controller 342 handles flash transactions and transfers the corresponding data from the network 330 to the flash memory 341. Accordingly, roles of flash firmware can be minimized.

The accelerator controller 350 manages communications between the host and the accelerator 300 through an interface connected to the host. In some embodiments, when the accelerator 300 connects to the host, for example, a northbridge 140 of the host, through a PCIe interface, the accelerator controller 350 may be a PCIe controller.

In some embodiments, the accelerator 300 may include a power/sleep controller (PSC) 370. The PSC 370 controls modes of other LWPs 310 in accordance with a control of a supervisor LWP to be described below. The supervisor LWP may put each LWP 310 in a sleep mode (which may be referred to as an idle mode), or revoke each LWP 310, using the PSC 370.

New, kernel execution in an accelerator according to an embodiment of the present invention is described with reference to FIG. 7 and FIG. 8.

Figure 7:
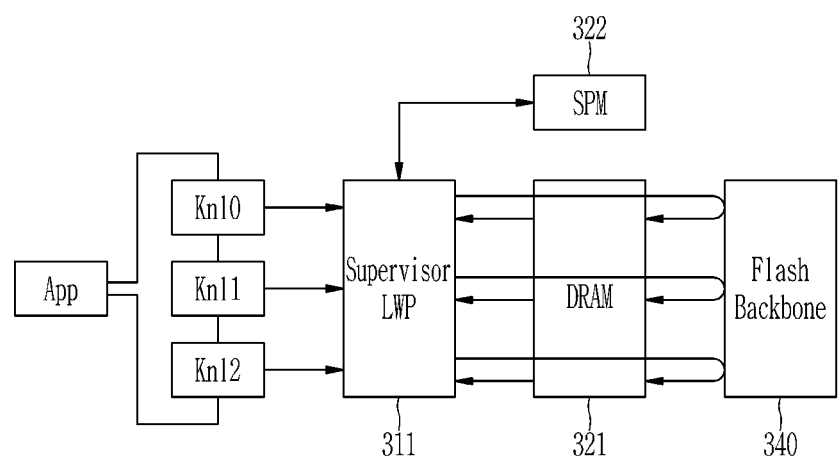
FIG. 7 shows multi-kernel execution included in one application in a flash-based accelerator according to an embodiment of the present invention.
Figure 8:
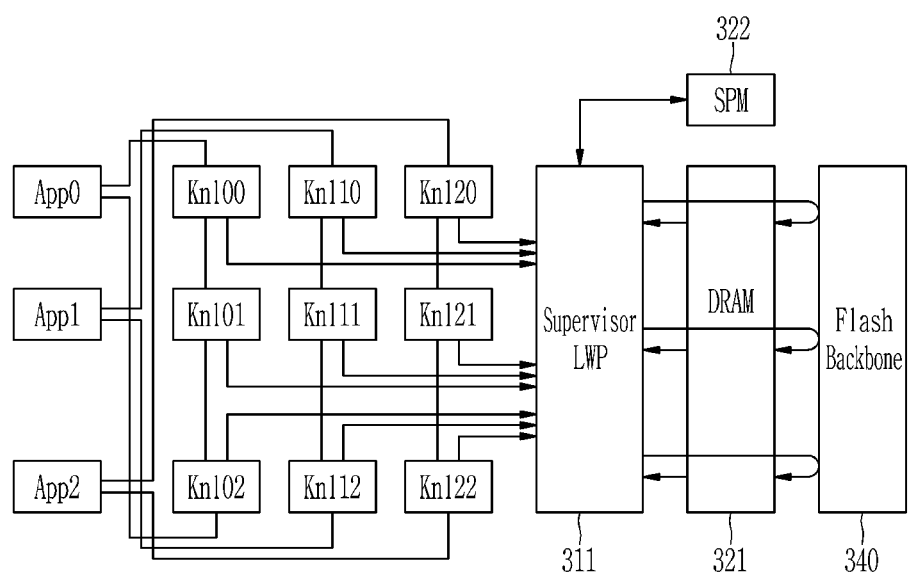
FIG. 8 shows multi-kernel execution included in a plurality of applications in a flash-based accelerator according to an embodiment of the present invention.

FIG. 7 shows multi-kernel execution included in one application in a flash-based accelerator according to an embodiment of the present invention, and FIG. 8 shows multi-kernel execution included in a plurality of applications in a flash-based accelerator according to an embodiment of the present invention.

Unlike traditional accelerators using a single instruction multiple threads (SIMT) model, a plurality of LWPs of a flash-based accelerator according to an embodiment of the present invention may execute different types of kernels in parallel, each of which includes various operation functions. This enables users to offload diverse applications and perform different types of data processing in concert, which is referred to as multi-kernel execution.

In one embodiment, as shown in FIG. 7, one application App may include multiple kernels (Knl0, Kn1, and Knl2), and a host may offload the kernels (Knl0, Kn1, and Knl2) in a flash-based accelerator to be executed in parallel. In another embodiment, as shown in FIG. 8, a host may offload multiple kernels (Knl00, Knl01, Knl02, Knl10, Knl11, Knl12, Knl20, Knl21, and Knl22) associated with different applications (App0, App1, and App2) in a flash-based accelerator to be executed in parallel. The multi-kernel execution can allow users to perform more flexible data processing near flash and open up the opportunities to make data processing more energy efficient than in the conventional accelerators.

In some embodiments, the lack of file and runtime systems may introduce several technical challenges to multi-kernel execution, including memory space management, I/O management, and resource protection. An easy-to-implement mechanism to address such issues is to read and write data on flash through a set of customized interfaces that the flash firmware may offer. This is the typically adopted mechanism in most active SSD approaches. However, this approach may be inadequate for a low-power accelerator platform. Specifically, as the kernels are independent of each other, they cannot dynamically be linked with flash firmware interfaces. Furthermore, for the active SSD approaches, all existing user applications must be modified by considering the flash interfaces, leading to an inflexible execution model.

In some embodiments, instead of allowing the multiple kernels to access the flash firmware directly through a set of static firmware interfaces, a predetermined processor may be allocated to govern a memory space of a data section of each LWP by considering flash address spaces. As shown in FIG. 7 and FIG. 8, the predetermined processor 311 may virtualize a flash backbone 340 by mapping the data section of each kernel to a physical flash memory, i.e., the flash backbone 340. In some embodiments, a predetermined LWP among a plurality of LWPs included in the accelerator may be the predetermined processor 311. Hereinafter, the predetermined LWP 311 is referred to as a "supervisor LWP". Accordingly, each LWP of the accelerator can directly access a flash memory of the flash backbone 340 through a memory request of the supervisor LWP, without any modification of an instruction set architecture or assistance, i.e., load/store instructions used in an existing computing device or without any assistance of a host-side storage stack.

In one embodiment, the supervisor LWP 311 may manage logical and physical address spaces of the flash backbone 340 by grouping physical pages of the flash backbone 340, and map a logical address to a data section of the kernel. In one embodiment, the supervisor LWP 311 may group physical pages of the flash backbone 340 across different flash channels (and different dies).

In some embodiments, mapping information may be stored to an SPM 322, and data associated with each kernel's data section may be stored to a low-power memory 321. Further, the supervisor LWP 311 may isolate and protect the physical address space of flash backbone 340 from the execution of multiple kernels. In one embodiment, whenever a kernel loaded to a specific LWP among the LWPs requires accessing its data section, the kernel can inform the supervisor LWP 311 about a logical address space where target data exist by passing a message to the supervisor LWP 311. The supervisor LWP 311 may then check a permission of such an access and translate it to a physical flash address. Lastly, the supervisor LWP 311 may issue a request to the flash backbone 340, and the flash controller 341 may bring data corresponding to the request to the low-power memory 321. In one embodiment, time-consuming tasks such as garbage collection or memory dump may be periodically performed by a different LWP, which can address potential overheads brought by the flash management of the supervisor LWP.

Next, kernel execution in a flash-based accelerator according to an embodiment of the present invention is described with reference to FIG. 9 to FIG. 11.

Figure 9:
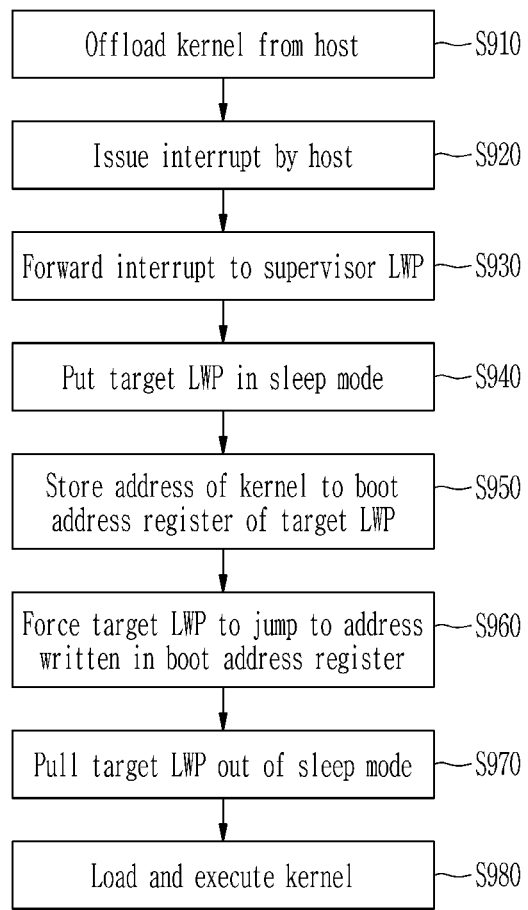
FIG. 9 is a flowchart showing a kernel offloading method in a flash-based accelerator according to an embodiment of the present invention.

FIG. 9 is a flowchart showing a kernel offloading method in a flash-based accelerator according to an embodiment of the present invention.

A user application may include one or more kernels. In some embodiments, a kernel may be represented by an executable object, referred to as a kernel description table. In one embodiment, the kernel can be compiled by a vendor-provided code generation tool. In one embodiment, the kernel description table may be a variation of a executable and linkable format (ELF), and may include an executable that contains several types of section information such as a kernel code (.text), a data section (.ddr3_arr), a heap (.heap), and a stack (.stack). Addresses of such sections may point to an L2 cache of each LWP, except for the data section, which is managed by a supervisor LWP.

Referring to FIG. 9, a target kernel of a user application is offloaded from a host to a designated memory space of a low-power memory 321 through an interface (S910). In one embodiment, the interface may be a PCIe interface. In one embodiment, the host may write a kernel description table associated with the target kernel to a PCIe base address register (BAR) by an accelerator controller (350 of FIG. 5), for example a PCIe controller. The BAR may be mapped to the low-power memory 321.

After completion of the kernel download, the host issues an interrupt, for example a PCIe interrupt, to the accelerator controller 350 (S920), and then the accelerator controller 350 forwards the interrupt to a supervisor LWP (S930). Then, the supervisor LWP stores an address of the low-power memory 321 of the downloaded kernel to a special register of a target LWP among a plurality of LWPs (S950). In some embodiments, the special register may be a boot address register. In some embodiments, the supervisor LWP may store the address of the low-power memory 321 to the special register of the target LWP after putting the target LWP in the sleep mode through the PSC 370 (S940).

The supervisor LWP then writes an inter-process interrupt register of the target LWP, forcing the target LWP to jump to the address written in the special register of the target LWP (S960). In some embodiments, the supervisor LWP may pull the target LWP out of the sleep mode through the PSC 370 (S970). Then, the target LWP loads and executes the specified kernel (S980). Thus, the supervisor LWP can decide the order of kernel executions within an LWP or across a plurality of LWPs.

Figure 10:
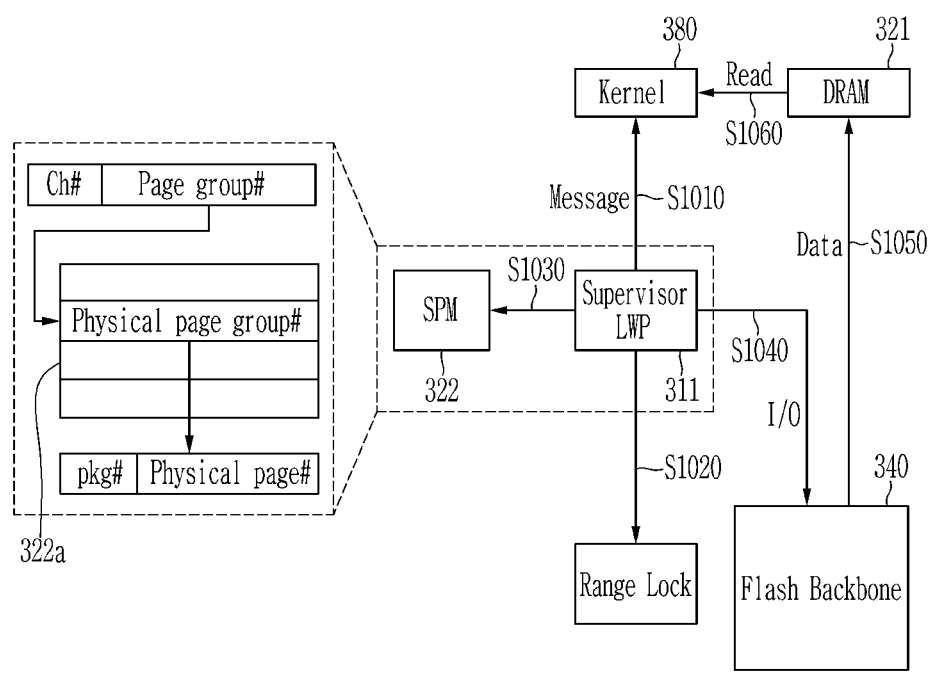
FIG. 10 shows a read operation in a flash-based accelerator according to an embodiment of the present invention.
Figure 11:
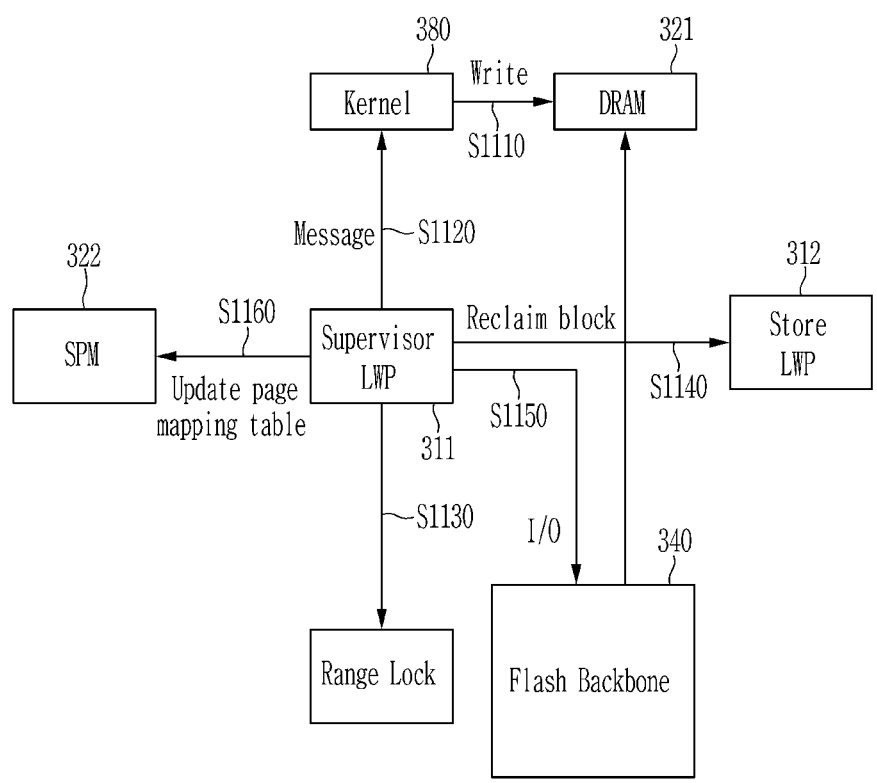
FIG. 11 shows a write operation in a flash-based accelerator according to an embodiment of the present invention.

FIG. 10 shows a read operation in a flash-based accelerator according to an embodiment of the present invention, and FIG. 11 shows a write operation in a flash-based accelerator according to an embodiment of the present invention.

Referring to FIG. 10, when a target kernel 380 loaded to a specific LWP is executed and accesses its data section, the target kernel 380 transfer a data section mapping request for mapping the data section to a flash to a supervisor LWP 311 (S1010). In this case, the target kernel 380 may transfer a queue message as the data section mapping request. A kernel on an LWP may map a memory region of a low-power memory pointed by its own data section to a designated flash backbone address. Accordingly, the target kernel 380 can declare a flash-mapped space for each data section (e.g., an input vector on the low-power memory) of the target kernel 380 by passing the queue message to the supervisor LWP 311. That is, the supervisor LWP 311 can declare a logical address space where target data exist.

In some embodiments, the queue message may include a request type (e.g, read or write), a pointer to the data section, and a flash backbone address. In one embodiment, the flash backbone address may be a word-based address or a byte-based address of a flash backbone. In one embodiment, the flash backbone address may be mapped to a memory (i.e., the low-power memory) of the data section of the target kernel.

In some embodiments, in a case where the request type of the queue message is the read, the target kernel 380 may pass the queue message to the supervisor LWP when a memory access requested by the kernel execution is missed from a cache, for example an L1 cache, of the target LWP.

The supervisor LWP 311 translates the word- or byte-based flash backbone address included in the queue message to a page-based flash address (1030). In one embodiment, the supervisor LWP 311 may refer a page mapping table 322a stored in an SPM 322 to translate the flash backbone address to the flash address.

In some embodiments, the supervisor LWP 311 may calculate a logical page group number from the flash backbone address. In one embodiment, the supervisor LWP 311 may divide the flash backbone address into a channel number (Ch #) of the flash backbone and a logical page group number (Page group #). When the request type is the read, the supervisor LWP 311 may refer the page mapping table 322a stored in the SPM 322 with the page group number, to retrieve a corresponding page mapping table entry including a physical page group number. Accordingly, the flash backbone address can be translated to the physical page group number. Next, the supervisor LWP 311 may calculate a package index and a page number in a corresponding package from the physical page group number. Alternatively, when a way is formed by packages in a plurality of channels, the supervisor LWP 311 may calculate a way index and a page number in each package included in a corresponding way from the physical page group number.

Next, the supervisor LWP 311 creates a memory request targeting a flash backbone 340 and then transfers the memory request, i.e., an I/O request, to a flash controller of the flash backbone 340 (S1040). The memory request may include a physical flash address. The flash controller then read data from a flash memory corresponding to the physical flash address, i.e., the page-based flash address and transfers the data to a low-power memory 321 (S1050). In some embodiments, the data may be stored to an address of the low-power memory 321 which is pointed by the pointer to the data section included in the queue message. In this case, the data may move from the flash memory of the flash backbone 340 to the low-power memory 321 through direct memory access (DMA). The target LWP can read the data from the low-power memory 321 into the cache, for example the L1 cache (S1060).

As described above, since each kernel can access the flash backbone 340 through the supervisor LWP 311, there is no direct data path between the flash controller and other LWPs which process the data near flash. Since the requests related to the flash backbone 340 are controlled by the supervisor LWP 311, the supervisor LWP 311 needs to protect the flash backbone 340. In order to protect the flash backbone 340, the supervisor LWP 311 may add permission information and an owner's kernel number for each page to the page mapping table entry. However, the page mapping table of the accelerator is written in persistent storage such as the SPM and is periodically updated considering flash I/O services such as garbage collection. Thus, adding temporary information such as the permission information and the owner's kernel number to the page mapping table may increase the complexity of the virtualization system, which can degrade overall system performance and shorten a life time of the flash. Accordingly, in some embodiments, a lock mechanism may be used to protect the flash backbone 340.

In one embodiment, the accelerator may use a range lock for the data section. In this case, upon receiving the data section mapping request, i.e., the queue message (S1010), the supervisor LWP 311 may block the data section mapping request if a range of the flash backbone address overlaps with the other address range by considering the request type (S1020). For example, in a case that the request type is the read (i.e., the data section of the kernel is mapped to the flash for the read), the supervisor LWP 311 may block the data section mapping request if the flash backbone address is being used for the write by the other kernel. The supervisor LWP 311 can translate the flash backbone address to the physical flash address (S1030) if the range of the flash backbone address does not overlap with the other address range.

In one embodiment, the supervisor LWP 311 may implement the range lock by using a red black tree structure. In this case, a start page number the data section mapping request may be used as a key, and each node may be augmented with the last page number of the data section mapping request.

Referring to FIG. 11, when a data section is used for the write by execution of a target kernel 380 by a target LWP, the target kernel 380 writes data to a low-power memory 321 (S1110). The target kernel 380 then transfers a data section mapping request for mapping the data section to a flash to a supervisor LWP 311 (S1120). In this case, the target kernel 380 may transfer the data section mapping request as a queue message. A request type of the queue message may be the write.

The supervisor LWP 311 allocates a new page group number for the queue message, and creates a memory request targeting a flash backbone 340 memory request and then transfers the memory request, i.e., an I/O request, to a flash controller of the flash backbone 340 (S1150). In some embodiments, the supervisor LWP 311 may calculate a page-based flash address from the allocated physical page group number, and add the page-based flash address to the memory request. In one embodiment, a logical page group number mapped to the new page group number may be stored as an entry of a page mapping table (S1160). That is, the supervisor LWP 311 may update the page mapping table stored in the SPM 322 and add a page mapping table entry corresponding to the new page group number. For example, the logical page group number corresponding to the word- or byte-based address included in the queue message may be stored as one mapped to the new page group number. Accordingly, the flash controller can store data of the data section stored in the low-power memory 321 to a flash memory corresponding to the new page group number, i.e., the physical flash address.

In some embodiments, in a case where there is an available page group number, the supervisor LWP 311 may allocate the new page group number by increasing the page group number used in a previous write. In a case where there is no more available page group number, the supervisor LWP 311 may reclaim a page group from the flash backbone 340 (S1140). In some embodiments, the supervisor LWP 311 may reclaim a physical block to reclaim the page group. In this case, the supervisor LWP 311 may perform an erase operation for the physical block to be reclaimed and may reclaim the page group based on the reclaimed physical block. In some embodiments, the supervisor LWP may update a page mapping table entry associated with the reclaimed physical block (or page group) in the page mapping table stored in the SPM 322. Accordingly, the flash controller may store the data of the data section stored in the low-power memory 321 to the flash memory corresponding to the reclaimed page group number. In one embodiment, the page mapping table entry associated with each physical block may be stored in some pages (e.g., the first two pages) within a target physical block of the flash backbone 340, as metadata.

In some embodiment, the accelerator may use a range lock for the data section. In this case, upon receiving the data section mapping request, i.e., the queue message (S1120), the supervisor LWP 311 may block the data section mapping request if a range of the flash backbone address overlaps with the other address range by considering the request type (S1130). For example, in a case that the request type is the write (i.e., the data section of the kernel is mapped to the flash for the write), the supervisor LWP 311 may block the data section mapping request if the flash backbone address is being used for the read by the other kernel.

In some embodiments, a predetermined LWP 312 may be allocated for storage management among the plurality of LWPs. Hereinafter, the predetermined LWP 312 is referred to as a "store LWP". The supervisor LWP 311 may transfer a request for reclaiming the physical block to the store LWP 312, and the store LWP 312 may reclaim the physical block from the flash backbone 340 (S1140). In one embodiment, the store LWP 312 may reclaim the physical block by selecting a victim block in a flash address space of the flash backbone 340. In one embodiment, instead of looking up all information of the page mapping table, the store LWP 312 may select a victim block number based on a round robin fashion and load the metadata a metadata page that resides on such block. Valid pages in the victim block may be migrated to a free block (e.g., a free block that sits on an end of the flash address space) based on the metadata. Once the victim block selection is completed, the page mapping table entries associated to the victim block and the migrated block may be updated in the SPM 322. These activities of the store LWP 312 may be performed in parallel with the address translation of the supervisor LWP 311, and in particular, may be performed in background. Accordingly, overheads by the multi-kernel execution can be reduced.

In one embodiment, the store LWP 312 may periodically dump the page mapping table entry stored in the SPM 322 to predetermined pages (e.g., the first two pages) of a corresponding block. That is, the store LWP 312 may journal the snapshot of the SPM 322.

In one embodiment, the above-described activities of the store LWP 312 may be performed in parallel with the address translation of the supervisor LWP 311, and in particular, may be performed in background. Accordingly, the address ranges that the store LWP 312 generates may be locked for the journaling or the block reclaim, but such activities can be performed in background such that they can be overlapped with the kernel executions and address translations.

As described above, the accelerator according to an embodiment of the present invention can simultaneously process data from different applications with diverse types of operational functions, and can allow multiple kernels to directly access the flash without an assistance of a host-level file system or an I/O runtime library. Further, the accelerator according to an embodiment of the present invention can govern the internal hardware resources without an assistance of an operating system (OS) of the host such that the multiple kernels can directly access the flash.

Next, multi-kernel scheduling in a flash-based accelerator according to an embodiment of the present invention is described with reference to FIG. 12 to FIG. 17.

Executing different kernels, each having many functions, across multiple LWPs, can introduce technical challenges such as load balancing and resource contention. To address these challenges, all internal LWP's resources may be exposed to the host so that users can finely control everything on their own. However, this approach can lead to a serious security problem, as an unauthorized user can access the internal resources and put them to an improper use. Further, this approach may also introduce another type of data movement overheads as frequent communications are required to use diverse resources from outside. Therefore, according to an embodiment of the present invention, two different scheduling models including inter-kernel execution scheduling and intra-kernel execution scheduling may be provided for multi-kernel execution scheduling. In the inter-kernel execution scheduling, each LWP may execute a specific kernel that performs data processing from the beginning to the end as a single instruction stream. The intra-kernel execution scheduling may split a kernel into multiple code blocks and concurrently execute them across multiple LWPs based on the input data layout.

First, inter-kernel execution scheduling in a flash-based accelerator according to an embodiment of the present invention is described with reference to FIG. 12, FIG. 13, and FIG. 14.

Figure 12:
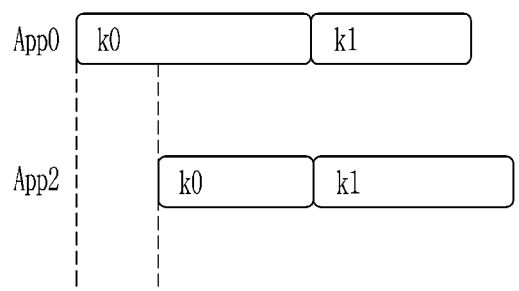
FIG. 12 shows an example of two applications.
Figure 13:
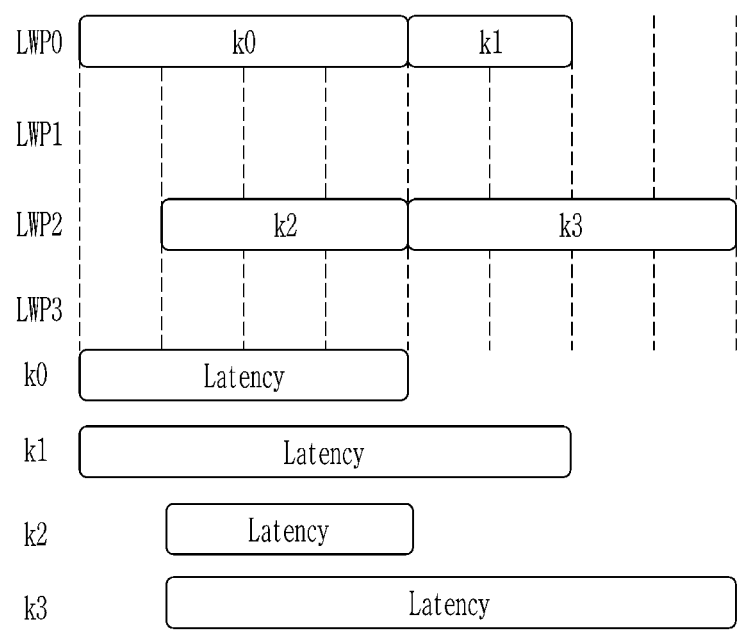
FIG. 13 shows an example of static inter-kernel scheduling.
Figure 14:
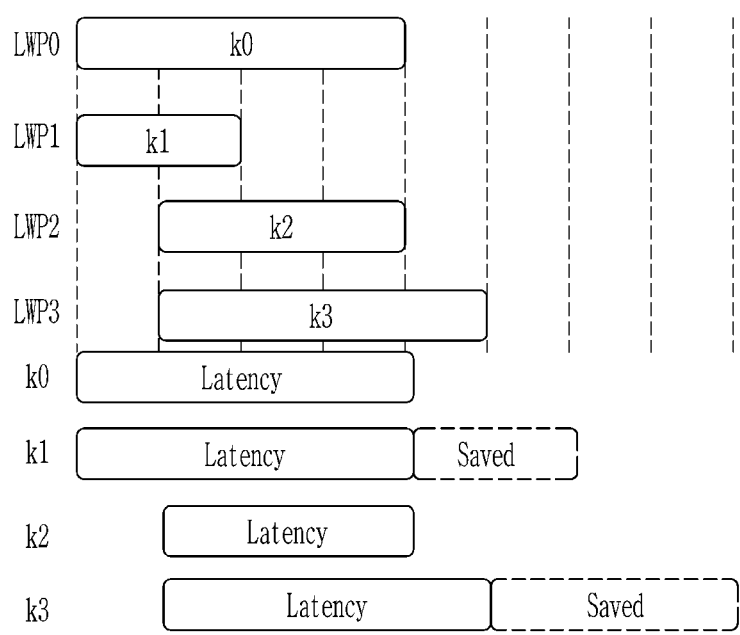
FIG. 14 shows an example of dynamic inter-kernel scheduling.

FIG. 12 shows an example of two applications, FIG. 13 shows an example of static inter-kernel scheduling, and FIG. 14 shows an example of dynamic inter-kernel scheduling.

Inter-kernel execution scheduling may be classified into static inter-kernel scheduling and dynamic inter-kernel scheduling.

Referring to an example shown in FIG. 12, two user applications App0 and App2 are provided, the application App0 includes two kernels k0 and k1, and the application App2 includes two kernels k2 and k3. It is assumed that application App2 is later offloaded to the accelerator than the application App0 and is later scheduled than the application App0.

In static inter-kernel scheduling according to one embodiment, an incoming kernel received from a host is statically allocated to a specific LWP based on its application number. For example, referring to FIG. 13, in static inter-kernel scheduling, a supervisor LWP may statically allocate the kernels k0 and k1 associated with the application App0 to an LWP (LWP0), and statically allocate the kernels k2 and k3 associated with the application App2 to an LWP (LWP2). Once the host issues all the kernels (k0 and k1, or k2 and k3) associated with each application App0 or App2, the accelerator does not require any further communication with the host until all computations are completed.

Even though the static inter-kernel scheduling is easy to implement and manage in the multi-kernel execution model, such scheduling may lead to poor resource utilization due to the imbalance of kernel loads. For example, in the example shown in FIG. 13, while other LWPs (LWP1 and LWP3) are in idle, the accelerator should suspend execution of the kernels k1 and k3 until execution of the previously-issued kernels k0 and k2 is completed.

In dynamic inter-kernel scheduling according to another embodiment, to address the poor utilization issue behind static inter-kernel scheduling, the supervisor may dynamically allocate and distribute different kernels among LWPs. If a new application has arrived, the supervisor LWP assigns kernels associated with the arrived application to any available LWPs. For example, the supervisor LWP may assign the kernels associated with the arrived application to the LWPs in a round robin fashion. Each LWP may inform the completion of kernel execution to the supervisor LWP, for example, through a hardware queue (360 of FIG. 5). Accordingly, the supervisor LWP can consecutively allocate a next kernel to a target LWP. For example, as shown in FIG. 14, the supervisor LWP may sequentially allocate the kernels k0, k1, k2, and k3 of the two applications App0 and App2 to the four LWPs (LWP0, LWP1, LWP2, and LWP3). Then, the kernels k1 and k3 can be executed in parallel with the kernels k0 and k2. Therefore, the latency of the kernels k1 and k3 can be reduced as compared to the case of the static inter-kernel scheduling. Therefore, in the dynamic inter-kernel scheduling, the resource utilization can be improved and the latency of the kernels can be reduced.

Next, intra-kernel execution scheduling in a flash-based accelerator according to an embodiment of the present invention is described with reference to FIG. 15, FIG. 16, FIG. 17, FIG. 18, and FIG. 19.

Figure 16:
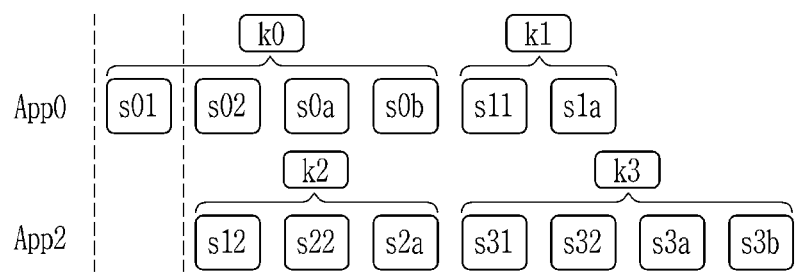
FIG. 16 shows another example of two applications.
Figure 17:
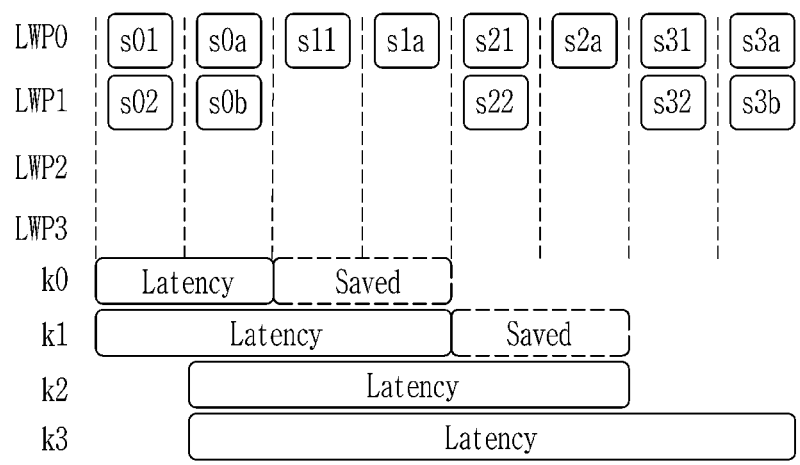
FIG. 17 shows an example of in-order intra-kernel scheduling.
Figure 18:
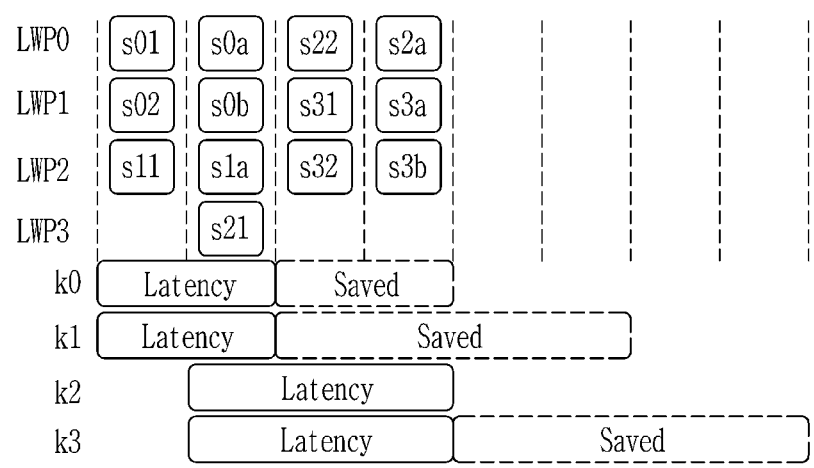
FIG. 18 shows an example of out-of-order intra-kernel scheduling.
Figure 19:
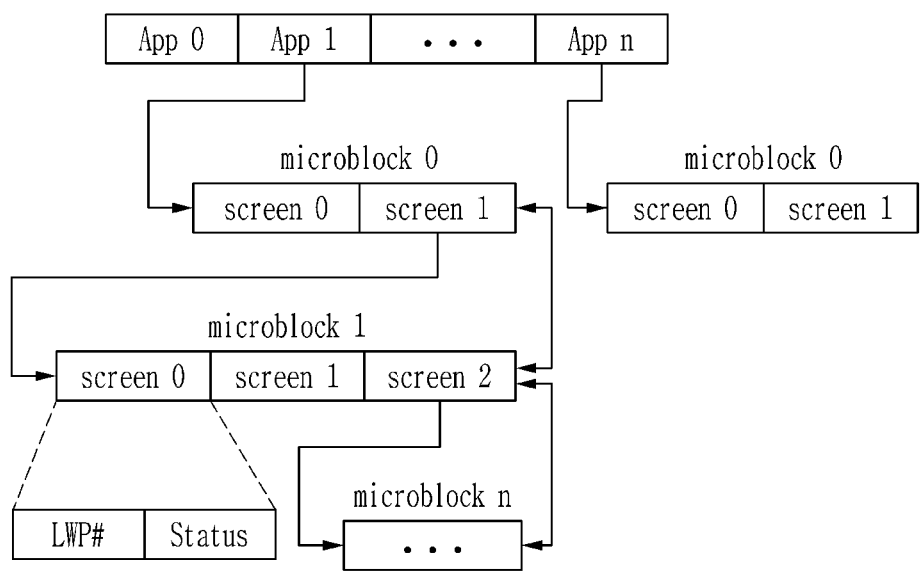
FIG. 19 shows multi-application execution chain.

FIG. 15 shows an example of a kernel, FIG. 16 shows another example of two applications, FIG. 17 shows an example of in-order intra-kernel scheduling, FIG. 18 shows an example of out-of-order intra-kernel scheduling, and FIG. 19 shows multi-application execution chain.

Intra-kernel execution scheduling may be classified into in-order intra-kernel scheduling and out-of-order intra-kernel scheduling.

A kernel in practice may be formed by multiple groups of code segments, referred to as microblocks. Each group has execution dependence on its input/output data. While the execution of different microblocks is serialized, there are operations, called screens, which can process different parts of an input vector in parallel, within the microblock. Different screens can be executed on different LWPs.

Referring to an example shown in FIG. 15, a goal of this kernel is to obtain a final output matrix (hz) by processing the input vector (_fict_). In microblock 0 (m0), the kernel first converts one-dimensional array (_fict_) which is an input vector to two-dimensional array (ey). The kernel then prepares new ey and ex vectors by calculating ey/hz and ex/hz differentials in microblock 1 (m1). Next, the kernel uses temporary vectors (ey and ex) for getting the final output matrix (hz) at microblock 2 (m2). In m2, the execution codes per inner loop iteration generate one element of an output vector (hz). Since there are no risks of write-after-write or read-after-write in microblock 2 (m2), we the outer loop of microblock 2 (m2) may be split into four screens and the four screens may be allocated across different LWPs for parallel executions.

Referring to an example shown in FIG. 16, two user applications App0 and App2 are provided, the application App0 includes two kernels k0 and k1, and the application App2 includes two kernels k2 and k3. Each kernel includes two microblocks, i.e., microblock 0 and microblock 1. In this case, microblock 0 of the kernel k0 includes two screen s01 and s02, and microblock 1 of the kernel k0 includes two screens s0a and s0b. Microblock 0 of the kernel k1 includes one screen s11, and microblock 1 of the kernel k1 includes one screen s1a. Microblock 0 of the kernel k2 includes two screens s21 and s22, and microblock 1 of the kernel k2 includes one screen s2a. Microblock 0 of the kernel k3 includes two screens s31 and s32, and microblock 1 of the kernel k3 includes two screens s3a and s3b.

In in-order intra-kernel scheduling according to one embodiment, various microblocks can be sequentially executed, and all screens of each microblock can be simultaneously executed by different LWPs. For example, as shown in FIG. 17, after the screens s01 and s02 of microblock 0 in the kernel k0 are executed at time T0, the screens s0a and s0b of microblock 1 in the kernel k0 are executed at time T1. After that, the screen s11 of microblock 0 in the kernel k1 is executed at time T2, and then the screen s1a of microblock 1 in the kernel k1 is executed at time T3. Subsequently, after the screens s21 and s22 of microblock 0 in the kernel k2 is executed at time T4, the screen s2a of microblock 1 in the kernel k2 is executed at time T5. After that, the screens s31 and s32 of microblock 0 in the kernel k3 is executed at time T6, and then the screens s3a and s3b of microblock 1 in the kernel k3 is executed at time T7. The two screens s01 and s02 of microblock 0 in the kernel k0 can be simultaneously executed by the different LWPs (LWP0 and LWP1). Similarly, a plurality of screens of the same microblock in the kernel can be simultaneously executed by the different LWPs.

As such, since the plurality of screens are simultaneously executed, the execution time can be reduced compared with the inter-kernel execution scheduling where the screens of one kernel are sequentially executed.

In out-of-order intra-kernel scheduling according to another embodiment, many screens associated with different kernels as well as different microblocks may be executed in an out-of-order fashion, unlike the in-order intra-kernel scheduling. That is, if there are any available LWPs at a certain time, the out-of-order intra-kernel scheduling may borrow some screens from a different microblock, which exist across different kernel or application boundaries, and allocate the screens to the available LWPs. Accordingly, the execution time of the microblocks can be reduced and overall system performance can be enhanced.

Since the two LWPs (LWP2 and LWP3) are in idle at time T0 as shown in FIG. 17, screens of the different microblocks can be filled at time T0 as shown in FIG. 18. For example, a supervisor LWP may pull the screen s11 of microblock 0 in the kernel k1 from time T2, and allocate the screen s11 to the LWP2 at time T1 such that the LWP2 can execute the screen s11. Similarly, the supervisor LWP may pull the screen s1a of microblock 1 in the kernel k1 from time T3, and allocate the screen s1a to the LWP2 at time T1 such that the LWP2 can execute the screen s1a. The supervisor LWP may pull the screen s21 of microblock 0 in the kernel k2 from time T4, and allocate the screen s21 to the LWP 3 at time T1 such that the LWP 3 can execute the screen s1a. Further, the screen s22 of microblock 0 in the kernel k2 and the screens s31 and s32 of microblock 0 in the kernel k3 may be allocated to the LWP0, the LWP1, and the LWP2, respectively, at time T2. The screen s2a of microblock 1 in the kernel k2 and the screens sa and sb of microblock 1 in the kernel k3 may be allocated to the LWP0, the LWP1, and the LWP2, respectively, as time T3. Therefore, the latency of the kernels can be reduced.

As shown in an example of FIG. 18, no screen may be scheduled before the completion of all the screens of a previous microblock. In the accelerator, this rule may be managed by multi-application execution chain, which is a list that includes data dependency information per application. Referring to FIG. 19, a root of the multi-application execution chain includes a plurality of pointers. Each pointer may correspond to an application Appi and indicate a list of nodes. The list of nodes may correspond to a microblock, and each node of the list may correspond to a screen. Each list of nodes may indicate a list of nodes in a next microblock. Each node may maintain a series of screen information per microblock such as an LWP ID and status of execution. The order of such nodes may indicate data-dependency relationships among the microblocks.

Next, results measured after implementing a flash-based accelerator 300 according to an embodiment of the present invention on a real hardware are described.

As expressed in the below Table 1, eight LWPs operating at 1 GHz clock, each having its own 64 KB L1 cache and 512 KB L2 cache are used at performance measurement. Among the eight LWPs, one LWP is used as a supervisor LWP and another LWP is used as a store LWP. In a memory system, 4 MB SRAM-based SPM is used as an SPM and 2 GB DDR3L DRAM is used as a low-power memory. Further, 16 flash dies are used as a flash memory.

TABLE 1

| Components | Specification | Working frequency | Typical power | Estimated bandwidth |
| --- | --- | --- | --- | --- |
| LWP | 8 processors | 1 GHz | 0.8 W/core | 16 GB/s |
| L1/L2 cache | 64 KB/512 KB | 500 MHz | N/A | 16 GB/s |
| SPM | 4 MB | 500 MHz | N/A | 16 GB/s |
| Low-power memory | DDR3L, 1 GB | 800 MHz | 0.7 W | 6.4 GB/s |
| Flash | 16 dies, 32 GB | 200 MHz | 11 W | 3.2 GB/s |
| PCIe | v2.0, 2 lanes | 5 GHz | 0.17 W | 1 GB/s |
| Tier-1 crossbar | 256 lanes | 500 MHz | N/A | 1.6 GB/s |
| Tier-2 crossbar | 128 lanes | 333 MHz | N/A | 5.2 GB/s |

The evaluation results show that the accelerator according to an embodiment of the present invention can improve the bandwidth of data processing by 127%, while reducing energy consumption by 78.4%, as compared to a conventional method of heterogeneous computing.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A flash-based accelerator configured to be connected to a host including a central processing unit (CPU) and a system memory, the flash-based accelerator comprising:
   a flash backbone including a flash memory and a flash controller;
   a plurality of processors that execute a plurality of kernels offloaded from the host;
   a memory system including a first memory that is used to map a data section of each kernel to the flash memory;
   a supervisor processor that maps a region of the first memory pointed by a data section of a first kernel to a region of the flash memory to allow first data to move between the region of the first memory and the region of the flash memory, based on a first message which is transferred in accordance with execution of the first kernel by a first processor among the plurality of processors; and
   a network that integrates the flash backbone, the memory system, the plurality of processors, and the supervisor processor.

2. The flash-based accelerator of claim 1, wherein the first data move between the first memory and the flash memory without assistance of an operating system (OS) of the host.

3. The flash-based accelerator of claim 1, wherein the first data move between the first memory and the flash memory without modification of an instruction set architecture used in an existing computing device.

4. The flash-based accelerator of claim 1, wherein the supervisor processor transfers a memory request indicating the region of the flash memory to the flash controller, and
   wherein the flash controller moves the first data between the region of the first memory and the region of the flash memory in accordance with the memory request.

5. The flash-based accelerator of claim 4, wherein the first processor accesses the flash backbone through the memory request without modification of existing load/store instructions.

6. The flash-based accelerator of claim 4, wherein when the first kernel reads the first data from the flash memory, the first message includes a pointer to the data section of the first kernel and a word- or byte-based address,
   wherein the supervisor processor translates the word- or byte-based address to a physical address in the flash memory, and
   wherein the memory system further includes a second memory that stores mapping information for translating the word- or byte-based address to the physical address.

7. The flash-based accelerator of claim 6, wherein the mapping information includes mapping information between a logical page group number corresponding to the word- or byte-based address and a physical page group number corresponding to the physical address.

8. The flash-based accelerator of claim 6, wherein the supervisor processor blocks processing of the first message when a range of the word- or byte-based address overlaps with a range of an address that another kernel uses for write.

9. The flash-based accelerator of claim 1, wherein a second processor among the plurality of processors transfers to the supervisor processor a second message for writing second data to the flash memory in accordance with execution of a second kernel,
   wherein the second message includes a pointer to a data section of the second kernel, and
   wherein the supervisor processor allocates a new region of the flash memory for the second message to allow the second data to move from a region of the first memory pointed by the data section of the second kernel to the new region of the flash memory.

10. The flash-based accelerator of claim 9, wherein the supervisor processor transfers a memory request indicating the new region of the flash memory, and
    wherein the flash controller transfers the second data from the region of the first memory pointed by the pointer to the data section of the second kernel to the new region of the flash memory, in accordance with the memory request.

11. The flash-based accelerator of claim 9, wherein the supervisor processor updates the mapping information based on a physical address corresponding to the new region of the flash memory and a word or byte-based address included in the second message.

12. The flash-based accelerator of claim 9, wherein the supervisor processor blocks processing of the second message when a range of the word- or byte-based address included in the second message overlaps with a range of an address that another kernel uses for read.

13. The flash-based accelerator of claim 9, wherein the supervisor processor allocates a physical page group number corresponding to the new region by increasing a physical page group number used in a previous write.

14. The flash-based accelerator of claim 9, further comprising a store processor,
wherein the supervisor processor transfers a request for reclaiming a physical block to the store processor to allocate a physical page group number corresponding to the new region when there is no available physical page group number in the flash memory, and
wherein the store processor reclaims the physical block by selecting a victim block in a space of the flash memory.

15. The flash-based accelerator of claim 14, wherein the store processor journals a snapshot of the second memory.

16. A computing device comprising:
the flash-based accelerator according to claim 1;
the host, and an interface that connects the flash-based accelerator and the host.

17. A flash-based accelerator configured to be connected to a host including a central processing unit (CPU) and a system memory, the flash-based accelerator comprising:
a flash backbone including a flash memory and a flash controller;
a plurality of processors that execute a plurality of kernels offloaded from the host;
a memory system including a first memory that is used to map a data section of each kernel to the flash memory, and a second memory that stores mapping information for translating a word- or byte-based address mapped to a region of the first memory pointed by the data section to a physical address in the flash memory;
a supervisor processor that, when read data are read from the flash memory in accordance with execution of each kernel, translates the word- or byte-based address to the physical address of the flash memory based on the mapping information, and transfers a memory request to the flash controller to allow the read data to move from the flash memory to the region of the first memory;
a network that integrates the flash backbone, the memory system, the plurality of processors, and the supervisor processor.

18. The flash-based accelerator of claim 17, wherein the read data move between the flash memory and the first memory without assistance of an operating system (OS) of the host.

19. The flash-based accelerator of claim 17, wherein the read data move between the flash memory and the first memory without modification of an instruction set architecture used in an existing computing device.

20. The flash-based accelerator of claim 17, wherein each of the plurality of processors accesses the flash backbone through the memory request without modification of existing load/store instructions.

* * * * *